United States Patent [19]

Barthélémy

[11] 4,319,672
[45] Mar. 16, 1982

[54] DEVICE FOR CONTROLLING THE ROTATION OF A DRIVEN ROTARY MEMBER

[75] Inventor: André J. Barthélémy, Saint Remy les Chevreuse, France

[73] Assignees: Societe Anonyme Automobiles Citroen; Automobiles Peugeot, both of Paris, France

[21] Appl. No.: 93,733

[22] Filed: Nov. 13, 1979

[51] Int. Cl.³ .................... B60K 41/02; F16D 13/04
[52] U.S. Cl. ..................... 192/0.02 R; 192/0.034; 192/0.096; 192/54; 74/388 R; 74/665 B
[58] Field of Search ............. 74/388, 388 PS, 665 B, 74/665 L; 192/0.02 R, 0.034, 0.096, 0.084, 54, 70, 93; 91/382

[56] References Cited

U.S. PATENT DOCUMENTS

| | | | |
|---|---|---|---|
| 2,483,950 | 10/1949 | Watson et al. | 74/388 R |
| 2,587,377 | 2/1952 | Penrose | 74/388 R |
| 2,869,383 | 1/1959 | Rapp et al. | 74/388 R |
| 3,071,225 | 1/1963 | Blau et al. | 192/93 X |
| 3,893,534 | 7/1975 | Steinmann | 192/0.02 R |
| 4,184,577 | 1/1980 | Miller | 192/54 X |
| 4,196,796 | 4/1980 | Kanamaru | 192/54 X |

FOREIGN PATENT DOCUMENTS 1196018 11/1957 France .
643528 9/1950 United Kingdom .

Primary Examiner—George H. Krizmanich
Attorney, Agent, or Firm—Stevens, Davis, Miller & Mosher

[57] ABSTRACT

The device includes an operating member adapted to drive the driven member positively and a frictional rotary assistance mechanism. It includes a transmission device for the motion between the operating member and the driven member comprising two plates, means for the resilient return of the plates towards one another, balls interposed between the plates and cooperating with inclined surfaces provided on these plates. The plates separate from one another during relative rotation and frictional coupling means are provided between an output of the assistance mechanism and at least one plate. The device is used for driven rotary members forming part of a machine tool or of an automobile.

14 Claims, 6 Drawing Figures

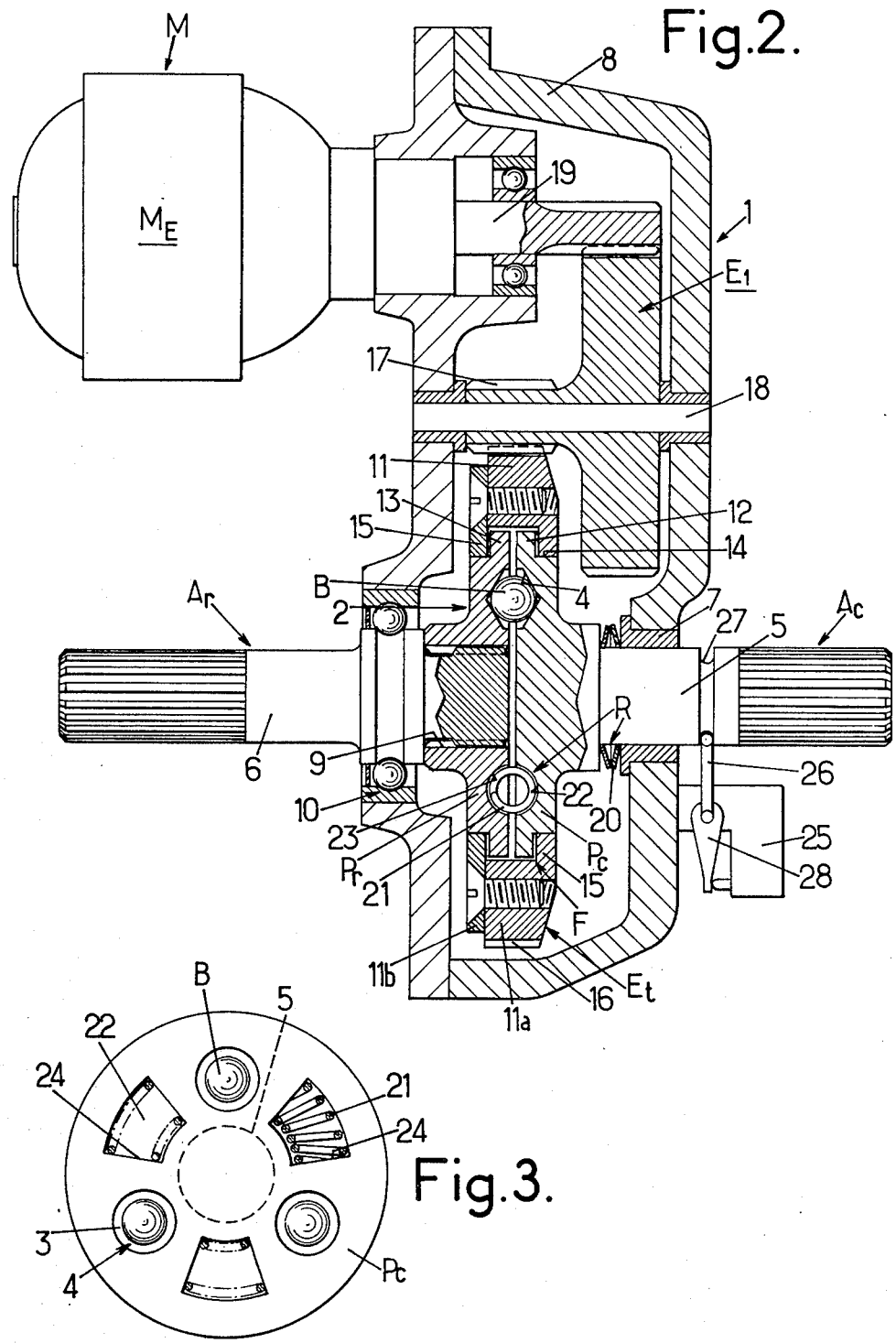

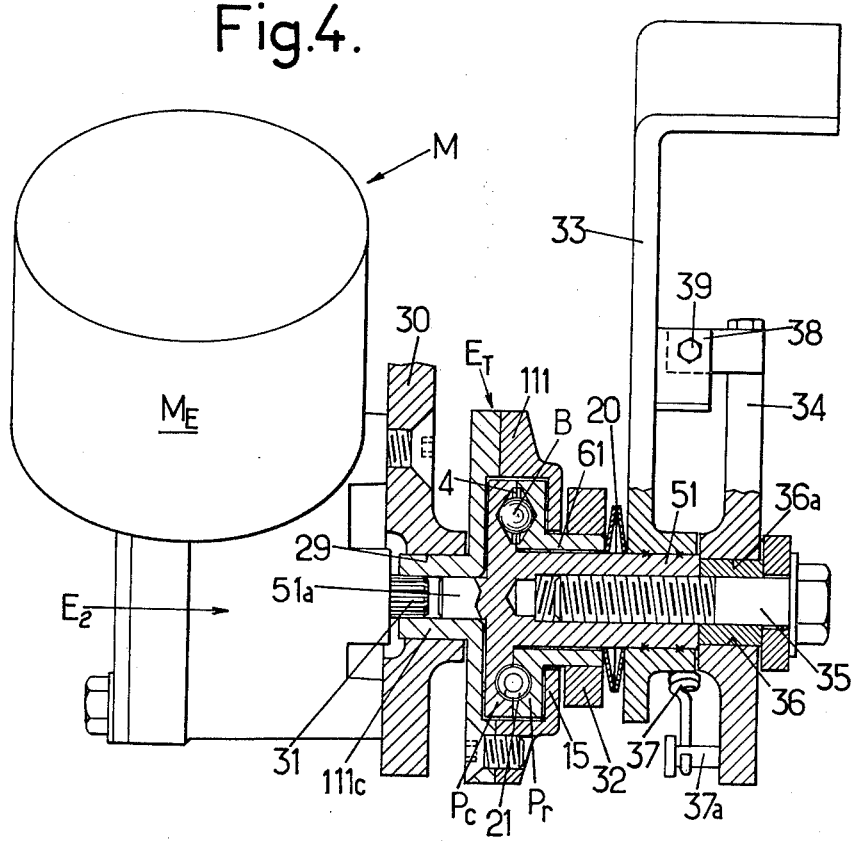
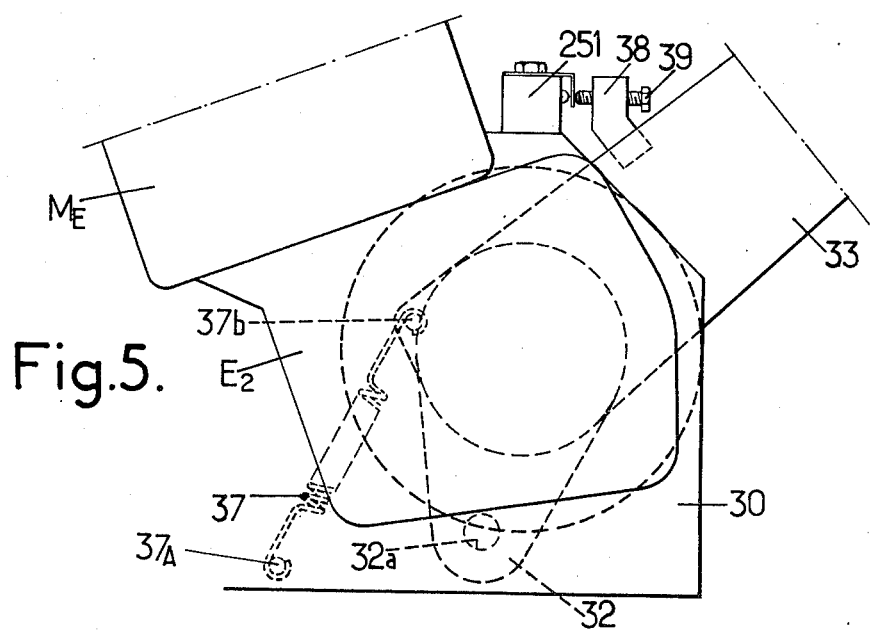

DEVICE FOR CONTROLLING THE ROTATION OF A DRIVEN ROTARY MEMBER

BACKGROUND OF THE INVENTION

The invention relates to a control device for the rotation of a driven rotary member, said device comprising an operating member adapted to drive the driven member positively and a frictional rotary assistance mechanism to facilitate the driving of the driven member.

The invention relates more particularly but, not exclusively, to the driving of driven rotary members in a machine tool or in an automobile vehicle.

It is a particular object of the invention to render control devices that respond to the various exigencies of practice better than hitherto and that enable the assistance mechanism to intervene only beyond an operating force threshold, and the transmission to the driven member of an increasing torque—at least between two respectively minimum and maximum thresholds—as the operating force increases.

GENERAL DESCRIPTION OF THE INVENTION

According to the invention, the rotational control device for a driven rotary member, of the above-defined type, is characterized by the fact that it includes between the operating or driving member and the driven member, a device for transmitting rotary movement, comprising two plates coupled in rotation respectively to the operating member and to the driven member, at least one of these plates being axially slideable, resilient return means being provided to urge the plates towards one another and balls being interposed, between the plates, to cooperate with inclined surfaces provided on the plates, so that a relative rotation of one plate with respect to the other, causes through the cooperation of the balls with the inclined surfaces, the axial displacement of at least one of the plates, frictional coupling means being provided between an output of the assistance mechanism and the plates which are displaced axially, the assembly being such that the frictional coupling of the assistance mechanism only comes into play beyond a predetermined threshold of operating force, to which threshold corresponds a predetermined axial separation of the plate. When this frictional coupling is produced, the contact pressure of the rubbing parts is all the higher as the operating force is greater.

The control device of the invention hence enables the frictional assistance mechanism to be held disengaged when the operating force exerted on the operating member is less than a predetermined threshold, and to insure, when the frictional coupling is produced, a contact pressure of the rubbing parts all the higher as the operating force is greater.

Preferably, the control device includes a frictional element constructed in the form of an annular box enclosing the two plates so that two opposite inner surfaces of the annular box can cooperate with the two plates to ensure a friction clutch action.

The driven member and the operating member may be constituted by two rotary shafts, situated in extension of one another, the plates being provided at the end of the two shafts neighboring one another.

According to another embodiment, one of the members, notably the operating member, comprises a shaft bearing one of the plates, the other member, notably the driven member, comprises a sleeve engaged around the shaft forming the operating member, this sleeve itself bearing the second plate.

The driven member may include a lever fast in rotation with the sleeve, of which lever the middle plane is perpendicular to the axis of the shaft forming the operating member.

The resilient means adapted to urge the plates towards one another may comprise axially acting springs, such as "Belleville" type washers, coaxial with the plates.

The resilient means may comprise also angular return springs, housed in recesses provided in the facing surfaces of the plates, these springs cooperating, at each of their ends, with a stop fast to one of the plates so that these springs ensure the angular return of the two plates into their middle position whatever the direction of relative rotation of the plate.

Advantageously, electrical contact means are provided, controlled by axial displacement of one of the plates or of one of the shafts caused either by the separation of the plates by the balls, or by the axial reaction of a pinion provided with inclined teeth; these electrical contact means serving to control the assistant means notably when the latter comprise an electrical motor.

The invention consists apart from the above-mentioned features, of certain other features which will be more explicitly discussed below with regard to particular embodiments described with reference to the accompanying drawings, but which are in no way to be taken as limiting.

BRIEF DESCRIPTION OF THE DRAWINGS

FIG. 2 is a partial cross-section of the first embodiment of a device according to the invention;

FIG. 3 is a front view of plate $P_c$ from the first embodiment;

FIG. 4 is an axial cross-section of the second embodiment;

FIG. 5 is a partial view from the left of the second embodiment; and

DESCRIPTION OF PREFERRED EMBODIMENTS

Figure 1:
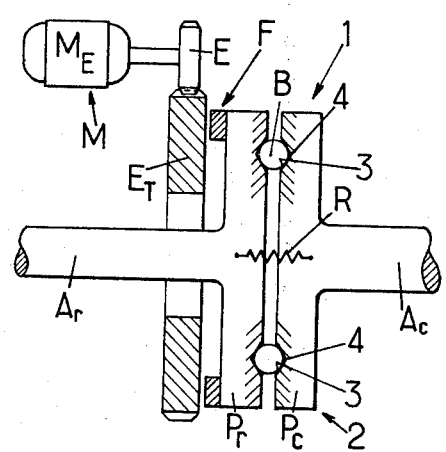
FIG. 1, is a schematic diagram of a control device according to the invention.

Referring to FIG. 1 of the drawings, there can be seen a rotation control device 1 of a driven rotary member $A_r$, which comprises an operating member $A_c$ adapted to drive the driven member $A_r$ positively and, a frictional rotary assistance mechanism M to facilitate the driving of the driven member $A_r$.

A transmission device 2 for rotary movement is provided directly between the operating member $A_c$ and the driven member $A_r$. This device 2 comprises two plates $P_c$ and $P_r$ coupled in rotation respectively to the operating member $A_c$ and to the driven member $A_r$.

At least one of these plates can slide axially; in the diagrammatic drawing of FIG. 1, the plate $P_r$ fast in rotation and in translation with the driven member $A_r$ can slide axially with driven member $A_r$. Resilient return means R are provided to urge the plates towards one another; balls B are interposed between the plates $P_c$ and $P_r$ to cooperate with the inclined surfaces provided on the plates. These inclined surfaces 3 are formed by inclined or incurved walls of dimples 4 formed in the facing surfaces of the two plates $P_r$, $P_c$. The dimples 4 are generally formed by conical holes, as can better be seen in FIGS. 2 and 4. A relative rotation of one plate with respect to the other, whatever the direction of this rotation, causes, by the cooperation of the balls B with the inclined surfaces 3, the separation of these plates and the axial displacement of that one of the plates ($P_r$ in the case of FIG. 1) which can be moved.

Frictional coupling means F are provided between an output $E_t$ of the assistance mechanism and at least ($P_r$) the plate which can be axially moved. The assistance mechanism M can include an electric motor $M_E$ whose shaft drives a pinion $E_t$ forming the output of the assistance mechanism, through a gear train such as E.

The balls B ensure the positive coupling of operating $A_c$ and driven $A_r$ members, and exert a separating force on the plates $P_r$ and $P_c$ (and consequently a contact pressure of friction coupling F) which increases as the torque transmitted from $A_c$ to $A_r$ through the balls B becomes greater.

The frictional coupling of the assistance mechanism M only comes into play beyond a minimum predetermined threshold of the force or of the operating torque exerted on the member $A_c$, to which threshold corresponds the predetermined axial spacing of the plates $P_r$ and $P_c$ which ensures that the friction against the output $E_t$ of the assistance mechanism. Means are provided to limit either the torque exerted on the operating member $A_c$, or the relative spacing of the two plates avoid having the balls B escape from the dimple recesses 4.

Referring to FIG. 2, in the first embodiment of the device 1 the operating member $A_c$ and the driven member $A_r$ are constituted by two rotary shafts 5, 6, situated in extension of one another. The plates $P_c$ and $P_r$ are provided at adjacent ends of the two shafts 5 and 6; the middle planes of these plates are perpendicular to the geometric axes of the shafts 5 and 6. The plate $P_c$ is fast, in rotation and in translation, with the shaft 5, which is mounted in a bearing 7 fixed in casing 8, with the capability of axial sliding. The plate $P_r$ includes a central opening 9 provided with grooves adapted to cooperate with complementary grooves provided at the end of the shaft 6 engaged opening 9. The plate $P_r$ is hence only connected in rotation to the shaft 6, and is slidably mounted on shaft 6, which is born by a ball-bearing 10 housed in an opening of the casing 8.

The output $E_t$ (FIG. 1) of the assistance mechanism M engages the friction element F with plate $P_r$ as the balls B cause the separation between the plates $P_c$, $P_r$ to increase, thus causing the friction element F to frictionally engage output $E_t$. Output $E_t$ can be constructed in the form of an annular box 11 enclosing circular peripheral edges 12, 13, of the plates $P_c$ and $P_r$. As seen in FIG. 2, each edge 12, 13, includes a peripheral recess 14 opening outwardly; each recess 14 is designed to receive a collar such as 15, fast to the box 11, and projecting radially inwardly. It is seen that the parts of least thickness of the edges 12 and 13, are gripped between the collars 15; the frictional drive is effected by the contact of the outer surfaces of the parts of least thickness of the edges 12 and 13, with the internal surfaces of the collars 15, perpendicular to the geometric axis of the shafts 5 and 6.

The box 11 is positioned at least axially by the plates $P_c$ and $P_r$; in the first embodiment, the box 11 is also positioned radially by these plates. This box 11 is constructed in two parts comprising a body 11a provided, on one side, with a collar 15, on which body is fixed, dismountably, a crown 11b forming, through its inner part in the radial direction the other collar 15. The body 11a includes on its outer periphery teeth 16 so as to be able to cooperate with a pinion 17 rotably mounted inside the casing 8, by a shaft 18 parallel to the geometric axis of the shafts 5 and 6. The pinion 17 belongs to the gear train $E_1$ transmitting the rotary movement, in a predetermined ratio, from the output shaft 19 of the motor. As seen in FIG. 2, this shaft 19 is arranged parallel to the shafts 5 and 6 and projects internally into the casing 8 by a grooved portion to cooperate with the gear train $E_1$. The electric motor $M_E$ is located outside the casing 8, notably on the same side as the shaft 6 with respect to this casing.

The resilient return means R, adapted to urge the plates $P_c$ and $P_r$ towards one another, comprise axially acting springs such as "Belleville" type washers 20 coaxial with the plates and centered on at least one of the shafts 5, 6. In the first embodiment, where the shaft 5 is slidably mounted, these washers 20 are arranged inside the casing 8 between a shoulder of the shaft 5 and the bearing 7 fast to the casing 8 and are centered on the shaft 5.

The resilient return means R also comprise angular return springs 21 (FIGS. 2 and 3) constituted by helical compression springs, housed in recesses 22, 23 provided in the opposite surfaces of the plates $P_c$ and $P_r$. The cross-section of each recess 22, 23 has a semi-circular shape. Each spring 21 is hence engaged over substantially half a spiral section in each housing 22, 23. These housings are closed, in the circumferential direction, by end walls 24 (FIG. 3). Normally, the positions of the shafts 5 and 6, are such that the walls 24 of the neighboring ends of the housings 22, 23 have the same angular position, but as soon as relative rotation is produced between the shaft 5 and the shaft 6, the end walls of the housing 22 are off-set angularly with respect to those of the housing 23. The spring 21 is then in abutment, at one end, substantially over half of its section, against the plate $P_c$ and, at its other end, against the plate $P_r$; whatever the relative direction of rotation between the shaft 5 and the shaft 6, the spring 21 will always be compressed and will have a tendency to bring back the plates and the shafts into their normal position. It is possible to provide three angular return springs 21 distributed regularly along the circumference, and three balls B distributed regularly between the springs. The mean position of the shafts 5 and 6 and of the plates corresponds to the stable angular position for which the respective dimple recesses 4 of the plates $P_r$ and $P_c$ are aligned in pairs, which ensures the plates are closest when in the mean position.

The friction coupling of the plates and of the rotary element $E_t$ (box 11) is effected preferably with a liquid contact, in which case the casing 8 can notably contain oil or grease, so as to ensure a greater progressivity of driving and a better removal of the heat produced by friction. In the case where the casing 8 is filled, at least partially, with oil, the shaft passages are, naturally, closed in a fluid-tight manner.

The friction drive of assistance mechanism M may be effected in a single direction, or in both directions. When the frictional drive is only effected in a single direction, it is possible to provide an electrical contact such as 25 actuated by the axial movement of the shaft 5 or of the axially movable plate ($P_c$). This electrical contact turns on the electric motor $M_E$ in response to axial movement of shafts. The operation of this motor $M_E$ is actuated before the operating force on the member $A_c$ reaches the lower threshold corresponding to the start of frictional clutching between the plates $P_c$, $P_r$ and the annular box 11. For this actuation, there is provided a finger 26 rotatably mounted on the box of the contact 25; this finger 26 cooperates with a groove 27 of the shaft 5 and acts on a lever 28 which directly controls the operating push rod of the electrical contact 25.

In the case where the frictional drive, through the assistance mechanism, must be effected in both directions, two electrical contacts (not shown in the case of FIG. 2) are provided to control the direction of rotation of the motor $M_E$; the actuation of these electrical contacts is ensured by a device (for example, a torquemeter) sensitive to the direction and to the amplitude of the operating force exerted on the shaft $A_c$. There again, the motor $M_E$ is activated at a force threshold lower than that which starts the frictional clutching between the plates and the annular box.

In the third Embodiment (FIGS. 4 and 5) the operating member $A_c$ is again constituted by a shaft 51 bearing the plate $P_c$. The driven member $A_r$ is constituted by a sleeve 61 engaged around the shaft 51. This sleeve 61 bears the plate $P_r$. The sleeve 61 is situated, with respect to the plate $P_c$, on the same side as the shaft 51 so that the opposite surfaces of the plates $P_r$ and $P_c$, in which the dimple recesses 4 are provided are, also, situated on the side of the shaft 51 with respect to the plate $P_c$. The box 111 is positioned axially by the plates, but is centered, radially, by a sleeve-shaped journal 111c engaged in a bore 29 provided in a fixed wall 30 serving as support. The electric motor $M_E$ and the gear means $E_2$ are supported on this wall 30 on the side opposite the box 11 and the shaft 51. The gear means $E_2$ include a splined output shaft 31 which cooperates with complementary grooves provided inside the sleeve 111c so as to ensure the rotation of the box 111. The shaft 51 includes beyond the plate $P_c$ an axial extension 51a engaging in the sleeve 111c, with a freedom of rotation, to ensure the relative centering of the box 111 and of the shaft. It is to be noted that the assembly of the box 111 and of the plates is no longer enclosed inside a casing as in the first embodiment.

A flange 32 is fixed at the end of the sleeve 61 distant from the plate $P_r$. The collar 15 is situated between this flange 32 and the plate $P_r$. As seen in FIG. 5, the flange 32 includes a radial extension including a hole 32a for a linkage to a control rod or cable. Shaft 51 is connected in rotation with the operating member which comprises, a control lever 33 mounted around the end of the shaft 51 distant from the plate $P_c$. The plate $P_r$ and the sleeve 61 are mounted free in translation around the shaft 51, and the resilient return washers 20 are compressed between the end of the sleeve 61 and the flange 32, and the lever 33. The shaft 51 is mounted free in rotation on a support plate 34; the mounting is ensured by providing a blind axial tapped hole in the shaft 51, which hole receives a screw 35, which ensures locking between the end of the shaft 51, of a sleeve 36 forming a bearing and mounted free in rotation in an opening 36a of the support 34. A spring 37, stretched between a pin 37a fastened to the wall 34 and another pin 37b fastened to the lever 33, ensures the return of this lever into its resting position. A tab 38, fastened to lever 33, is provided with a pressure screw 39 which, when the lever 33 is at rest, is supported against an electrical contact 251. This contact 251 activates the electric motor $M_E$. 00. As soon as the lever 33 is moved, the contact 251 is closed (for example) and motor $M_E$ is placed in operation.

There can again be found in the the second embodiment the balls B housed in the dimple recesses 4 between the plates and the angular return springs 21.

The operation of the control devices shown in the second embodiment are explained below.

The second embodiment relates to a device for assisting a driven rotary member 61, 32 rotate through a limited arc. The driving member is formed by lever 33.

By exerting an operating torque on the control member 51, (in a clockwise direction in FIG. 5), the control member 51 rotates with lever 33 which brings the screw 39 away from contact 251, to start motor $M_E$. The driven member 6 is driven positively through balls B cooperating with the plates $P_c$, $P_r$. Shaft 6 is still driven without assistance. When the operating torque reaches a threshold value, the balls B cause start to ride out of the dimples 4 and, in opposition to the resilient return means R, causes a sufficient separation of the plates for frictional clutching to occur. The driving assistance by M of the shaft 6 then takes place. The contact pressure of the frictional parts (box 111 and plates $P_r$, $P_c$) increases as the operating torque (operating force) increases considering that the balls B in contact with the inclined bottom of the dimple recesses 4, generate axial thrusts on the plates, tending to separate them, proportional to the tangential forces due, in line with the balls, to the torque that they transmit. There is hence a progressivity of assistance.

When lever 33 reaches the end of its stroke, the plate $P_c$ does not rotate any more. The box 111, driven, by motor $M_E$ continues to rotate and the frictional coupling causes plate $P_r$ to rotate until it reaches its means position relative to plate $P_c$, at which point the plates come close enough together to disengage from the box 111. Plate $P_r$ will be held in its mean position by rotating box 111. Box 111 will stop rotating only when lever 33 returns to its original off position.

Referring to the third embodiment (FIG. 6), there can be seen a diagram of a modification enabling two different electrical contacts to be controlled according to the relative direction of rotation between the plates, by using a reaction of inclined teething.

The driven member $A_r$ is slidably mounted with the wall $8_A$ of the casing 8. For this, the bearing 100 carrying the driven shaft is mounted free in translation in the housing of the wall 8. The ring 100a of the bearing is subject to the action of two opposing springs $r_1$ and $r_2$ supported against rings 40, 41 fixed axially, anchored in grooves provided at the two axial ends of the housing. A control member 42, formed by a finger, passes through an opening 43 of the wall of the housing for the bearing 100. The finger 42 is connected in translation to the bearing 100 and the member $A_r$ can control, according to the direction of movement, either an electrical contact $C_1$ (movement towards the left of FIG. 6), or an electrical contact $C_2$ (movement towards the right of FIG. 6); each contact $C_1$, $C_2$, controls the setting in motion of the electrical motor $M_E$ in a particular rotary direction, corresponding to the relative angular movement of the plates $P_r$, $P_c$. The end of the shaft $A_r$ is provided with teething inclined to the geometrical axis of this shaft, so that the transmission of the torque is accompanied by an axial force whose direction depends on the direction of rotation of the shaft $A_r$. The resilient return means of the plates comprise a spring $R_b$ (helical spring or elastic washers) between the wall of the casing 8 and the plate $P_c$.

The box 112 includes an outer toothing 162 (straight or inclined) such that the driving in rotation of the box is accompanied by negligible axial thrust or one in the same direction as that produced by the toothing 44.

The operation of the third embodiment is as follows. At rest, there is axial equilibrium between the springs $R_b$, $r_1$ and $r_2$. In a first direction of rotation of the control member $A_c$, the shaft $A_r$ is rotated, in the same direction, by the balls B. The inclination of the toothing 44, produces an axial force in the direction of the arrow $f_1$ and causes the sliding of the driven member $A_r$ and of the bearing 100 along the arrow $f_1$. The spring $r_1$ is compressed, whilst the springs $r_2$ and $R_b$ are slightly relaxed. The contact $C_1$ is closed causing the rotation of the motor $M_E$ in the direction adapted to cause the box 112 to rotate in the same direction as $A_c$ and $A_r$. The axial thrust, due to the inclination of the toothing 162 permits:

confirmation of member $A_r$ compressing $r_1$;

the application to the plate $P_c$, hence to the shaft $A_c$, of an axial force compensating for the reduction in the thrust of the spring $R_b$ previously mentioned.

When the force (operating torque) on $A_c$ increases, $P_c$ and $P_r$ separate; spring $r_1$ forming a stop, compresses spring $R_b$. It is to be noted that the separation of the plates $P_r$ and $P_c$ is of the order of only some tenths of a millimeter, less than the yielding of the springs $r_1$ or $r_2$ which is of the order of 1 mm (one millimeter).

In the opposite direction of rotation of the shaft $A_c$, the shaft $A_r$ slides in the opposite direction along the arrow $f_2$. The spring $r_2$ is compressed until it comes to its extreme stop position. The spring $r_1$ is relaxed whilst the spring $R_b$ is slightly compressed.

The contact $C_2$ is actuated by the finger 42 and controls the actuation of the motor $M_E$ in the direction which drives the box 112 in the same direction as $A_c$. If necessary, if the toothing 162 is inclined, the box 112 is thrust axially along the arrow $f_2$ thus confirming the placing in axial support of $A_r$ against the spring $r_2$, but not exerting any thrust on the plate $P_c$.

When the operating force (rotary torque) on the shaft $A_c$ increases, the balls B by cooperating with the inclined ramps separate the plates $P_r$ and $P_c$; the plate $P_r$ in axial abutment against $r_2$ remains axially immobile, the axial stop being confirmed by the axial thrust due to the inclination of the toothing, which increases with the assistance torque which increases with increases in the pressure between the box 112 and the plates $P_r$ and $P_c$. The plate $P_c$ is thrust in the direction of the arrow $f_2$ against the spring $R_b$. It is to be noted that the minimum operating torque (threshold $S_1$), to be exerted on the shaft $A_c$ to compress the springs $r_1$ or $r_2$ and to actuate the contact $C_1$ or $C_2$, can cause a slight separation of the plates $P_r$, $P_c$ by the cooperation of the balls B and of the ramps, but this separation is insufficient to ensure the clutching of the box 112 against the plates $P_r$ and $P_c$, this clutching only starting for a threshold $S_2$ of the torque $A_c$ which is greater than $S_1$. The threshold $S_1$ can be less than the corresponding threshold at the beginning of the seperation of the plates $P_r$, $P_c$, if prestressed angular return springs are used such as springs 21 of FIG. 3. The spring $r_2$ would then be eliminated, the equilibrium at rest then remaining ensured by $r_1$ and $R_b$ alone and a space being provided, at rest, between the ring 40 and the sliding ring of the bearing 100 to enable the movement of the finger 42 adapted to actuate the contact $C_2$.

According to a modification, the actuation of the contact such as $C_1$ and $C_2$ could be effected by sliding of the shaft $A_c$, instead of $A_r$, for example by using a gearing with inclined toothing arranged between the shaft $A_c$ and the control lever of the type of lever 33 of FIG. 4.

Figure 6:
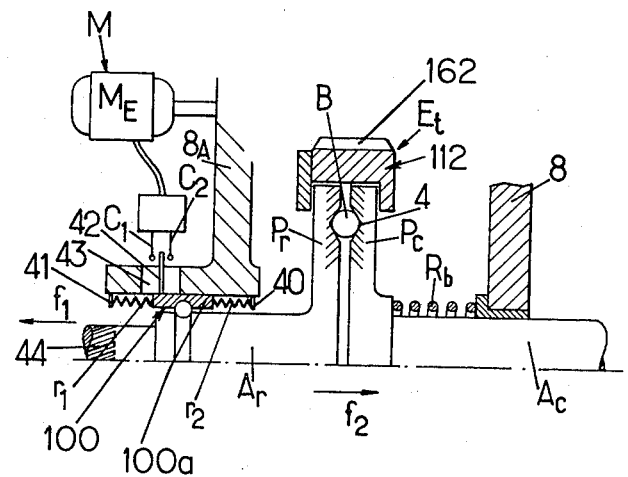
FIG. 6, is a schematic diagram of a third embodiment.

It is to be noted that the control finger 42 could be directly connected axially to the shaft $A_r$ instead of being connected to the bearing ring 100 as shown in FIG. 6. The device of the invention is suitable for numerous applications, notably in the fields of automobiles and machine tools, where manual or foot controls take part.

I claim:

1. A device for controlling the rotation of a driven rotary member comprising an operating member adapted to drive the driven member positively and a frictional rotary assistance mechanism to facilitate the driving of the driven member, said device further comprising a rotary motion transmission device positioned between the operating member and the driven member comprising two plates coupled respectively to the operating member and to the driven member, at least one of said plates being axially slidable with respect to the other plate and having resilient return means urging said plates towards one another and balls being interposed between said plates, to cooperate with inclined surfaces provided on the plates, such that the relative rotation of one plate with respect to the other, causes, by the cooperation of the balls with the inclined surfaces, the axial displacement of at least one of said plates in the direction which separates said plate from the other, frictional coupling means being provided between an output of said assistance mechanism and at least one of said plates which is axially movable, the frictional coupling of the assistance mechanism only engaging said plurality of plates once a predetermined axial separation of said plates has occurred and when said frictional coupling is engaged with said plurality of plates the amount of friction between the output of the assistance mechanism and the frictional coupling increases with the amount of force required to drive the driven member.

2. A rotational control device according to claim 1, in which said frictional coupling is formed in the shape of an annular box enveloping the two plates such that two opposite inner surfaces of the annular box cooperate with the two plates to ensure the frictional engagement of said coupling and said plates.

3. A device according to claim 1, wherein said driven member and said operating member comprise two rotary shafts, located in extension of one another, the plates being provided at the ends of the two shafts close to one another.

4. A device according to claim 1, wherein said operating member comprises a shaft bearing one of the plates, said driven member comprises a sleeve engaged around said operating member shaft, said sleeve bearing on the second of said plates.

5. A device according to claim 4, wherein said driven member further comprises a flange fast in rotation with the sleeve, of which flange the middle plane is perpendicular to the axis of the shaft forming the operating member, which shaft is connected in rotation to a control lever.

6. A device according to claim 1, wherein said resilient means comprise axially acting springs.

7. A device according to claim 6, wherein said springs comprise "Belleville" type washers coaxial to said plates.

8. A device according to claim 6, wherein said springs comprise angular return springs, housed in recesses provided in the opposite surfaces of the plates, said springs cooperating at each of their ends, with a stop fast to one of the plates such that said springs bias the angular return of the two plates into their mean position whatever the relative direction of rotation of the plates.

9. A device according to claim 1, comprising an electrical contact means controlled by the axial movement of one of said plates and of one of said shafts, with respect to a fixed part, which displacement is caused by the separation of the plates by the balls, these electrical contact means serving to control the assistance means notably when the latter comprise an electric motor.

10. A device according to claim 1, comprising electrical contact means controlled by the axial displacement of one of the shafts, which displacement is caused by the axial reaction of a gear wheel with inclined teeth, these contact means including two different electrical contacts controlled according to the relative direction of rotation between the plates.

11. A device according to claim 1, additionally comprising means to limit the relative spacing of the two plates to avoid the balls from escaping from the recesses.

12. A device according to claim 11, comprising a frictional element formed in the shape of an annular box enveloping the two plates so that two opposite inner surfaces of the annular box can cooperate with the two plates to ensure the friction clutch action.

13. A device for controlling the rotation of a driven rotary member comprising:
 (a) a driven operating member;
 (b) a driven member;
 (c) a rotation control device between said operating member and said driven member through which said driven member drives said operating member, said rotation control device comprising an operating plate non-rotatably engaged with said operating member, a driven plate non-rotatably engaged with said driven member adjacent to said operating plate, inclined surfaces being on the facing surfaces of said inclined plates, at least one of said plates being movable towards the other, resilient return means to urge said plates together, balls interposed between said plates riding on said inclined surfaces so as to vary the spacing between plates as the plates rotate with respect to each other, and a friction coupling attached to at least one of said movable plates;
 (d) a rotary assistant mechanism comprising an assistance mechanism rotatably driving an output, said output frictionally engaging said frictional coupling when the spacing between said plates becomes greater than a threshold level, said output drives said driven member through said friction coupling such that the driving force of the output frictionally transferred to said friction coupling increases as the spacing between said plates increases beyond said threshold level.

14. A device for controlling the rotation of a driven rotary member comprising:
 (a) an operating member being rotatably driven;
 (b) a driven member;
 (c) a transmission comprising an annular operating plate non-rotatably attached to said operating member, an annular driven plate non-rotatably attached to said driven member, at least one of said plates movable axially, resilient return means urging said plates together, said plates having adjacent surfaces, said adjacent surfaces each having a plurality of dimples having inclined surfaces, balls interposed between said plates riding in said dimples such that the rotation of one of said plates with respect to the other causes said balls to ride on said included surfaces varying the separation between said plates, a angular resilient return spring biasing against rotation of one of said plates with respect to the other plate, a frictional coupling extending radially outward from at least one of said axially movable plates;
 (d) a rotary assistance mechanism comprising an assistance mechanism rotatably driving an output, said output having a plurality of collars adjacent to said frictional couplings on said plates, said collars frictionally engaging said friction couplings once the separation between said plates exceeds a certain threshold amount, said output, rotatably driving said plates through the frictional engagement between said collars and said frictional coupling, and contact means detecting axial movement of said plate and activating said assistance mechanism before frictional engagement between said collars and said plates.

* * * * *